Sept. 19, 1961  E. PADDISON  3,001,101

ELECTRICAL PROTECTIVE RELAYS

Filed March 2, 1959

Inventor:
Eric Paddison
By:
Stevens, Davis, Miller & Mosher
Attorneys

United States Patent Office 3,001,101
Patented Sept. 19, 1961

3,001,101
ELECTRICAL PROTECTIVE RELAYS
Eric Paddison, Stafford, England, assignor to The English Electric Company Limited, London, England, a British company
Filed Mar. 2, 1959, Ser. No. 796,694
Claims priority, application Great Britain Mar. 4, 1958
8 Claims. (Cl. 317—52)

This invention relates to electrical protective relays.

The object of the invention is to improve the performance of a protective relay of the kind which operates in accordance with an amplitude comparison as, for example, a distance relay which responds to an operating signal derived from a current in a protected circuit and a D.C. restraining signal derived from the voltage of the protected circuit.

According to the invention, a protective relay of the kind which operated in accordance with an amplitude comparison made between an operating signal and a D.C. restraining signal comprises, as means by which the D.C. restraining signal is derived, a full wave bridge rectifier having an asymmetrical electrical configuration formed by half wave rectifier elements of different type but matched in respect of their inherent forward resistance characteristics so as to improve the performance of the relay when operating and restraining signals of low amplitude are compared.

According to a feature of the invention, in a distance relay of the kind which responds to an operating signal derived from a current in a protected circuit and a D.C. restraining signal derived from the voltage of the protected circuit, the means by which the D.C. restraining signal is derived from the voltage of the protected circuit comprise a full wave bridge rectifier having an asymmetrical electrical configuration formed by half wave rectifier elements of a different type but matched in respect of their inherent characteristics so as to improve the impedance characteristic of the relay.

According to another feature of the invention, said bridge rectifier comprises four half wave rectifier elements, two of one type and two of another, connected in a Graetz arrangement so that regardless of the instantaneous polarity of its A.C. input signal an output current flows through a rectifier element of either type.

According to a further feature of the invention, one pair of said rectifier elements is of a type having a high forward resistance characteristic, and the other pair is of a type having a low forward resistance characteristic.

According to another feature of the invention, two of said rectifier elements are of the selenium type and two are of the germanium type. Alternatively, the selenium type rectifier elements may be replaced by silicon elements and the germanium type elements may be replaced by copper oxide elements.

According to yet another feature of the invention, two of said rectifier elements differ from the other two in respect of their number of plates or cells.

According to a further feature of the invention, two of said rectifier elements are of the selenium or silicon type and two are of the germanium or copper oxide type, and the characteristics of both types are further matched to improve the impedance characteristic of the relay by suitably proportioning the numbers of plates or cells between the selenium or silicon type and germanium or copper oxide type rectifiers.

The invention will now be described with reference to the accompanying drawing in which.

Figure 1:
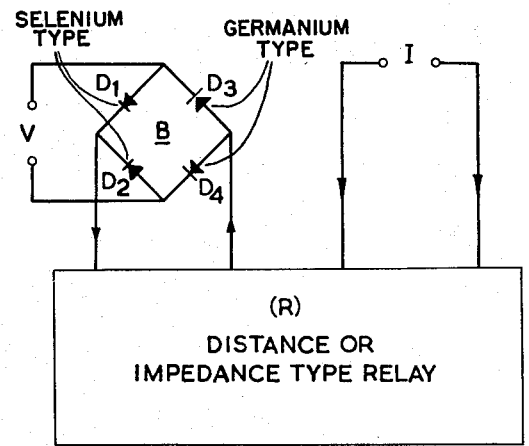
FIG. 1 shows schematically a relay incorporating the invention.

In FIG. 1 a distance or impedance type relay R is depicted schematically in block form. The relay responds to an operating signal denoted I and a voltage signal denoted V. These signals are supplied at terminals where indicated. The signal V is applied in the relay R as a restraining signal but is first rectified by the full wave bridge rectifier denoted B. As is shown in the drawing this bridge rectifier B comprises four half wave rectifiers $D_1$, $D_2$, $D_3$, and $D_4$ respectively connected in Graetz fashion as shown.

Figure 2:
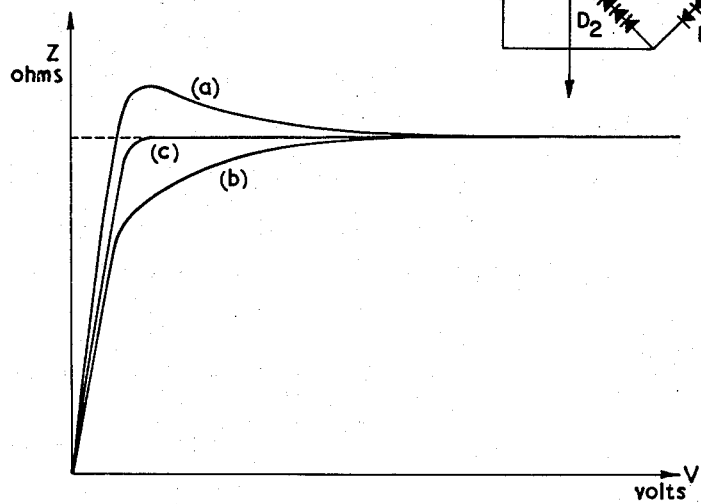
FIG. 2 shows the dependence of the operating characteristics of a typical relay of the kind shown in FIG. 1 when the rectifier elements of the bridge rectifier have different forms.

In operation the relay R functions to effect a comparison between the operating current signal I and the D.C. version of the restraining signal V and according to the result of this comparison operates to perform a tripping function determined by the ratio of the amplitudes of the two signals. It is usually desired in a distance or impedance type relay of the kind under consideration that the operating characteristics should correspond to a fixed line impedance. That is, tripping should occur when a definite ratio between the signal I and the signal V is exceeded and regardless of the absolute magnitudes of either signal. In practice, it has been found that the operating characteristic of the relay depends upon the absolute magnitudes of V and I when these are relatively small. In particular it has been found that when all of the half wave rectifiers $D_1$, $D_2$, $D_3$ and $D_4$ are of the selenium type the operating characteristic of a typical relay has the form indicated by the curve $a$ in FIG. 2. Here Z denotes the operating impedance of the relay and is a measure of the ratio between the magnitudes of I and V when the relay operates. It is preferred that the operating characteristic of the relay should be constant as indicated by the broken line but, as will be seen, this is not the case at low values of V and, in fact, curve $a$ rises from zero impedance to pass this desired impedance and return to it at the high voltages. It has also been found that if all the half wave rectifiers $D_1$, $D_2$, $D_3$ and $D_4$ are of the germanium type the impedance characteristic rises to the desired value less quickly and without exceeding it at any part of the voltage range.

This invention seeks to provide a compromise between the all germanium type bridge B and the all selenium type bridge B by providing, for example, that half wave rectifiers $D_1$ and $D_2$ are of the selenium type and that half wave rectifiers $D_3$ and $D_4$ are of the germanium type. This means that any half wave of the signal V will, regardless of its polarity, cause current to pass through a selenium type rectifier and a germanium type rectifier in its circulation path through the relay.

When this compromise arrangement is tested it is found that the relay has an operating characteristic intermediate that of curve $a$ and that of curve $b$. A typical characteristic is that shown by curve $c$. This curve corresponds to an improved relay characteristic, A simple expedient in the design of the bridge B has rendered the operating impedance of the relay constant to a lower operating voltage level.

A feature of the invention provides for an improvement in the relay performance by the matching of selenium and germanium. It is possible to use as half wave rectifiers $D_1$, $D_2$, $D_3$ and $D_4$ selenium or germanium rectifiers having different numbers of plates or cells. Thus, in a preferred embodiment the half wave rectifiers $D_1$ and $D_2$ comprise rectifiers of the selenium type, whereas the half wave rectifiers $D_3$ and $D_4$ comprise rectifiers of the germanium type and the rectifiers of the different type have a different number of plates connected in circuit as shown, for example, in FIG. 3 in which the bridge B of FIG. 1 is shown to be modified so that the selenium-type rectifiers $D_1$ and $D_2$ have four plates whereas the germanium-type rectifiers $D_3$ and $D_4$ have three plates. By suitably adjusting the relative numbers of plates in circuit as between the selenium type and germanium type rectifiers a true matching of the bridge components can be obtained so that optimum advantage can be taken of the improvement afforded by this invention.

Figure 3:
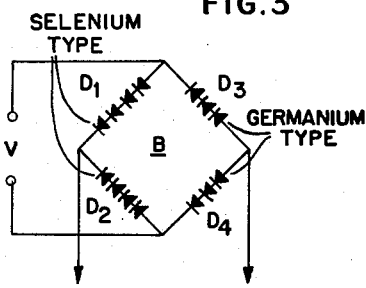
FIG. 3 shows a modified form of the bridge rectifier of FIG. 1 with different numbers of rectifier plates in the different arms of the bridge.

The relay R may comprise a transductor device of the kind forming the subject of the co-pending patent application of John Walter Freeman Smith for Electrical Protective Relay Devices and Protective Relay Systems Incorporating Such Devices, Ser. No. 584,698, filed May 14, 1956. In FIG. 3 of the drawing accompanying the specification of this latter application, a transductor is shown to comprise a saturating transformer device having primary and secondary windings with the magnetic coupling between these windings determined by the control current in a control winding. The primary winding is energized in proportion to the current of a protected circuit and would therefore be energized by the current I as shown schematically in FIG. 1 of the accompanying drawing. The control winding is energized from the output from a bridge rectifier which is supplied by a voltage signal from the protected circuit. The control winding would therefore be energized by the output from the bridge B in FIG. 1. The secondary winding of the device is the output winding of the system and would supply the tripping signal shown schematically in FIG. 1.

Rectifier characteristics are unimportant at the high signal levels and the relay performance at these levels is therefore unaffected by the modification provided by this invention.

What I claim as my invention, and desire to secure by Letters Patent, is:

1. A protective relay of the kind which operates in accordance with an amplitude comparison made between an operating signal and a D.C. restraining signal comprising, as means by which the D.C. restraining signal is derived, a full wave bridge rectifier having an asymmetrical electrical configuration formed by half wave rectifier elements of different type but matched in respect of their inherent forward resistance characteristics so as to improve the performance of the relay when operating and restraining signals of low amplitude are compared.

2. A protective distance relay according to claim 1, of the kind which responds to an operating signal derived from a current in a protected circuit and a D.C. restraining signal derived from the voltage of the protected circuit, wherein the means by which the D.C. restraining signal is derived from the voltage of the protected circuit comprise a full wave bridge rectifier having an asymmetrical electrical configuration formed by half-wave rectifier elements of different type but matched in respect of their inherent characteristics so as to improve the impedance characteristic of the relay.

3. A protective relay according to claim 1, wherein said bridge rectifier comprises four half wave rectifier elements, two of one type and two of another, connected in a Graetz arrangement so that regardless of the instantaneous polarity of its A.C. input signal an output current flows through a rectifier element of either type.

4. A protective relay according to claim 1, wherein two of said rectifier elements differ from the other two in respect of their number of plates or cells.

5. A protective relay according to claim 1, wherein two of said rectifier elements are of the selenium or silicon type and two are of the germanium or copper oxide type, and the characteristics of both types are further matched to improve the impedance characteristic of the relay by suitably proportioning the numbers of plates or cells between the selenium or silicon type and germanium or copper oxide type rectifiers.

6. A protective relay according to claim 2, wherein two of said rectifier elements are of the selenium type and two are of the germanium type.

7. A protective relay according to claim 2, wherein two of said rectifier elements are of the silicon type and two are of the copper oxide type.

8. A protective relay according to claim 3, wherein one pair of said rectifier elements is of a type having a high forward resistance characteristic, and the other pair is of a type having a low forward resistance characteristic.

References Cited in the file of this patent

UNITED STATES PATENTS

| | | |
|---|---|---|
| 2,601,473 | Van Wegensbergen | June 24, 1952 |
| 2,849,662 | Britten | Aug. 26, 1958 |